(12) United States Patent
Sullivan

(10) Patent No.: US 8,453,371 B1
(45) Date of Patent: Jun. 4, 2013

(54) POWERED JIGGING DEVICE FOR FISHING

(76) Inventor: James A Sullivan, Eau Claire, WI (US)

(*) Notice: Subject to any disclaimer, the term of this patent is extended or adjusted under 35 U.S.C. 154(b) by 293 days.

(21) Appl. No.: 12/924,726

(22) Filed: Oct. 4, 2010

Related U.S. Application Data

(60) Provisional application No. 61/248,677, filed on Oct. 5, 2009.

(51) Int. Cl.
*A01K 91/06* (2006.01)

(52) U.S. Cl.
USPC .......................................................... 43/19.2

(58) Field of Classification Search
USPC ...................................... 43/19.2, 15, 16, 21.2
See application file for complete search history.

(56) References Cited

U.S. PATENT DOCUMENTS

| | | | | |
|---|---|---|---|---|
| 2,758,407 A | * | 8/1956 | Speidell | 43/19.2 |
| 3,031,790 A | * | 5/1962 | Duryea | 43/19.2 |
| 3,292,906 A | * | 12/1966 | Thordarson | 43/19.2 |
| 3,422,561 A | * | 1/1969 | McLean | 43/19.2 |
| 3,550,302 A | * | 12/1970 | Creviston et al. | 43/19.2 |
| 3,568,352 A | * | 3/1971 | Hill | 43/19.2 |
| 3,665,633 A | * | 5/1972 | Scott | 43/19.2 |
| 3,839,810 A | * | 10/1974 | Lagasse | 43/19.2 |
| 4,081,922 A | * | 4/1978 | Johnson | 43/19.2 |
| 4,120,112 A | * | 10/1978 | McBain | 43/19.2 |
| 4,251,939 A | * | 2/1981 | Tiede | 43/19.2 |
| 4,597,215 A | * | 7/1986 | Otremba | 43/19.2 |
| 4,603,499 A | * | 8/1986 | Simborski | 43/19.2 |
| 4,660,317 A | * | 4/1987 | Evans | 43/19.2 |
| 4,680,885 A | * | 7/1987 | Lindell et al. | 43/19.2 |
| 4,779,371 A | * | 10/1988 | Braud | 43/19.2 |
| 4,811,514 A | * | 3/1989 | Jordan | 43/19.2 |
| 4,916,847 A | * | 4/1990 | Rusgo | 43/19.2 |
| 4,932,151 A | * | 6/1990 | Cicha | 43/19.2 |
| 4,951,411 A | * | 8/1990 | Ecker | 43/19.2 |
| 5,036,616 A | * | 8/1991 | Wilsey | 43/19.2 |
| 5,056,255 A | * | 10/1991 | Campbell | 43/19.2 |
| 5,119,580 A | * | 6/1992 | Schulte et al. | 43/19.2 |
| 5,437,121 A | * | 8/1995 | Chacon et al. | 43/19.2 |
| 5,473,835 A | * | 12/1995 | Emett | 43/19.2 |
| 5,540,010 A | * | 7/1996 | Aragona | 43/19.2 |
| 5,570,534 A | * | 11/1996 | Ford | 43/19.2 |
| 5,638,628 A | * | 6/1997 | Davis | 43/19.2 |

(Continued)

FOREIGN PATENT DOCUMENTS

| FR | 2675661 A1 | * | 10/1992 |
|---|---|---|---|
| GB | 2460751 A | * | 12/2009 |

(Continued)

*Primary Examiner* — Darren W Ark

(74) *Attorney, Agent, or Firm* — Tipton L. Randall

(57) ABSTRACT

A powered jigging device for fishing includes a base section secured to an upright support section. A pole holder assembly pivotally attached to the upright support section includes a plate portion parallel to the upright support section and pivotally attached at a pivot point thereto, and a pole attachment portion secured to the plate portion above the pivot point thereof. A fishing pole is mounted in the pole attachment portion. A motor member rigidly secured to the upright support section is operatively attached to a rotor member positioned below the pivot point of the plate portion. A multipivot point linkage is pivotally secured at one end to the rotor member and at an opposite end to the plate portion of the pole holder assembly below the pivot point thereof. Rotation of the rotor member by the motor member causes pivoting movement of the pole holder assembly through the multipivot point linkage there between.

17 Claims, 5 Drawing Sheets

U.S. PATENT DOCUMENTS

| | | | |
|---|---|---|---|
| 5,987,801 A * | 11/1999 | Anderson | 43/17 |
| 6,009,656 A * | 1/2000 | Knepp | 43/19.2 |
| 6,363,650 B1 | 4/2002 | Beeler | |
| 6,415,543 B2 * | 7/2002 | Keller | 43/19.2 |
| 6,622,421 B1 * | 9/2003 | Daniels | 43/21.2 |
| 6,817,136 B2 * | 11/2004 | Novak | 43/19.2 |
| 6,898,892 B2 | 5/2005 | Senckowski | |
| 2007/0011937 A1 * | 1/2007 | Roh et al. | 43/19.2 |
| 2007/0266615 A1 * | 11/2007 | Norman | 43/19.2 |
| 2012/0266516 A1 * | 10/2012 | White | 43/19.2 |

FOREIGN PATENT DOCUMENTS

| | | | |
|---|---|---|---|
| JP | 07170889 A | * | 7/1995 |
| JP | 07250600 A | * | 10/1995 |
| JP | 08126458 A | * | 5/1996 |
| JP | 11346623 A | * | 12/1999 |
| JP | 2004357625 A | * | 12/2004 |
| JP | 2006238860 A | * | 9/2006 |
| WO | WO 03086068 A1 | * | 10/2003 |
| WO | WO 2004016084 A1 | * | 2/2004 |

* cited by examiner

POWERED JIGGING DEVICE FOR FISHING

CROSS-REFERENCE TO RELATED APPLICATIONS, IF ANY

This application claims the benefit under 35 U.S.C. §119 (e) of co-pending provisional application Ser. No. 61/248,677, filed 5 Oct. 2009. Application Ser. No. 61/248,677 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates generally to a jigging device, and more specifically it relates to a powered jigging tip down device with a universal pole holder for hands-free jigging of a fishing pole.

2. Background Information

Jigging of a fishing pole fitted with a bait is a common method of attracting fish to the bait. This method of fishing can be quite tedious and a number of patents have been issued that disclose devices that are used to automate the jigging motion of the fishing pole. Some of the patents which have been granted include U.S. Pat. No. 3,550,302 by Creviston et al.; U.S. Pat. No. 3,568,352 by Hill; U.S. Pat. No. 4,603,499 by Simbroski; U.S. Pat. No. 4,660,317 by Evans; U.S. Pat. No. 4,680,885 by Lindell et al.; U.S. Pat. No. 4,811,514 by Jordan; U.S. Pat. No. 4,916,847 by Rusgo; U.S. Pat. No. 4,951,411 by Ecker; U.S. Pat. No. 5,036,616 by Wilsey; U.S. Pat. No. 5,056,255 by Campbell; U.S. Pat. No. 5,119,580 by Schulte et al.; U.S. Pat. No. 5,437,121 by Chacon, Jr. et al.; U.S. Pat. No. 5,473,835 by Emett; U.S. Pat. No. 5,540,010 by Aragona; U.S. Pat. No. 5,570,534 by Ford; U.S. Pat. No. 5,638,628 by Davis; U.S. Pat. No. 5,987,801 by Anderson; U.S. Pat. No. 6,009,656 by Knepp; U.S. Pat. No. 6,363,650 by Beeler; U.S. Pat. No. 6,415,543 by Keller; U.S. Pat. No. 6,622,421 by Daniels; U.S. Pat. No. 6,817,136 by Kovak; U.S. Pat. No. 6,898,892 by Senckowski and U.S. 2007/0266615 by Norman.

The present invention generally relates to a powered jigging tip down device with a universal pole holder for fishing, which includes a gear motor, a cam-shaped crank, a two-piece linkage, a pivoting carrier plate, a universal pole holder, an adjuster for controlling the amount of jig action, electronics to control jigging speed, an upright support and a base.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a powered jigging tip down device with a universal pole holder for hands-free jigging of a fishing pole.

Another object is to provide a powered jigging tip down device with a universal pole holder for fishing that allows fishermen to jig several poles at one time, increasing the odds of catching more fish.

Another object is to provide a powered jigging tip down device with a universal pole holder for fishing that allows the use of most types of fishing poles.

Another object is to provide a powered jigging tip down device with a universal pole holder for fishing that has an adjustable stroke amount for different types of fish.

Another object is to provide a powered jigging tip down device with a universal pole holder for fishing that indicates a fish bite by pulling the tip of the pole down and putting up a signal flag.

Another object is to provide a powered jigging tip down device with a universal pole holder for fishing that doesn't fight the fish with the motorized action, only with the weight of the pole and reel.

Other objects and advantages of the present invention will become obvious to the reader and it is intended that these objects and advantages are within, the scope of the present invention. To the accomplishment of the above and related objects, this invention may be embodied in the form illustrated in the accompanying drawings, attention, being called to the fact, however, that the drawings are illustrative only, and that changes may be made in the specific construction illustrated and described within the scope of this application.

SUMMARY OF THE INVENTION

The invention is directed to a powered jigging device for fishing. The powered jigging device includes a base section secured to an upright support section with a pole holder assembly pivotally attached to the upright support section. The pole holder assembly including a plate portion positioned parallel to the upright support section and pivotally attached at a pivot point thereto, and a pole attachment portion secured to the plate portion above the pivot point thereof. A fishing pole is mounted in the pole attachment portion. A motor member is rigidly secured to the upright support section with a rotor member operatively attached to the motor member for rotation thereof, the rotor member positioned below the pivot point of the plate portion. A multipivot point linkage is pivotally secured at one end to the rotor member and pivotally secured at an opposite end to the plate portion of the pole holder assembly below the pivot point thereof. Rotation of the rotor member by the motor member causes pivoting movement of the pole holder assembly through the multipivot point linkage there between.

In a preferred embodiment of the invention, the powered jigging device includes a base section secured to an upright support section with a pole holder assembly pivotally attached to the upright support section. The pole holder assembly including a plate portion positioned parallel to the upright support section and pivotally attached at a pivot point thereto, and a pole attachment portion secured to the plate portion above the pivot point thereof. A fishing pole is mounted in the pole attachment portion. A motor member is rigidly secured to the upright support section with a rotor member operatively attached to the motor member for rotation thereof. The rotor member is positioned below the pivot point of the plate portion. A multipivot point linkage is pivotally secured at one end to the rotor member and pivotally secured at an opposite end to one of a plurality of apertures in the plate portion of the pole holder assembly below the pivot point thereof. A stop member is secured to the upright support section to contact the pole holder assembly and limit pivotal movement thereof. A signal member is attached to the pole holder assembly to signal a fish bite. Rotation of the rotor member by the motor member causes pivoting movement of the pole holder assembly through the multipivot point linkage there between to provide jigging of the fishing pole.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE EMBODIMENTS

Nomenclature

| | |
|---|---|
| 10 | Powered Jigging Device |
| 15 | Base Section |
| 17 | Crossbar Portion of Base Section |
| 18 | Leg Portions of Base Section |
| 20 | Upright Support Section |
| 30 | Pole Holder Assembly |
| 35 | Plate Portion of Pole Holder Assembly |
| 37 | Pivot Point of Plate Portion |
| 38 | Attachment Apertures of Plate Portion |
| 40 | Pole Attachment Portion of Pole Holder Assembly |
| 45 | Slot in Pole Attachment Portion |
| 47 | Retaining Strap of Pole Attachment Portion |
| 50 | Motor Member |
| 52 | Battery for Motor Member |
| 54 | Switch Member |
| 55 | Rotor Member |
| 60 | Multipoint Pivot Linkage |
| 62 | First End of Pivot Linkage |
| 64 | Second End of Pivot Linkage |
| 66 | Center Pivot Point of Pivot Linkage |
| 70 | Stop Member |
| 80 | Signal Flag Member |
| P | Fishing Pole and Reel |

Construction

The invention is a powered jigging device for fishing that includes a base section secured to an upright support section with a pole holder assembly pivotally attached to the upright support section. The pole holder assembly including a plate portion positioned parallel to the upright support section and pivotally attached at a pivot point thereto, and a pole attachment portion secured to the plate portion above the pivot point thereof. A fishing pole is mounted in the pole attachment portion. A motor member is rigidly secured to the upright support section with a rotor member operatively attached to the motor member for rotation thereof, the rotor member positioned below the pivot point of the plate portion. A multipivot point linkage is pivotally secured at one end to the rotor member and pivotally secured at an opposite end to the plate portion of the pole holder assembly below the pivot point thereof. Rotation of the rotor member by the motor member causes pivoting movement of the pole holder assembly through the multipivot point linkage there between to impart jigging action to the fishing pole and baited fishing line.

Figure 1:
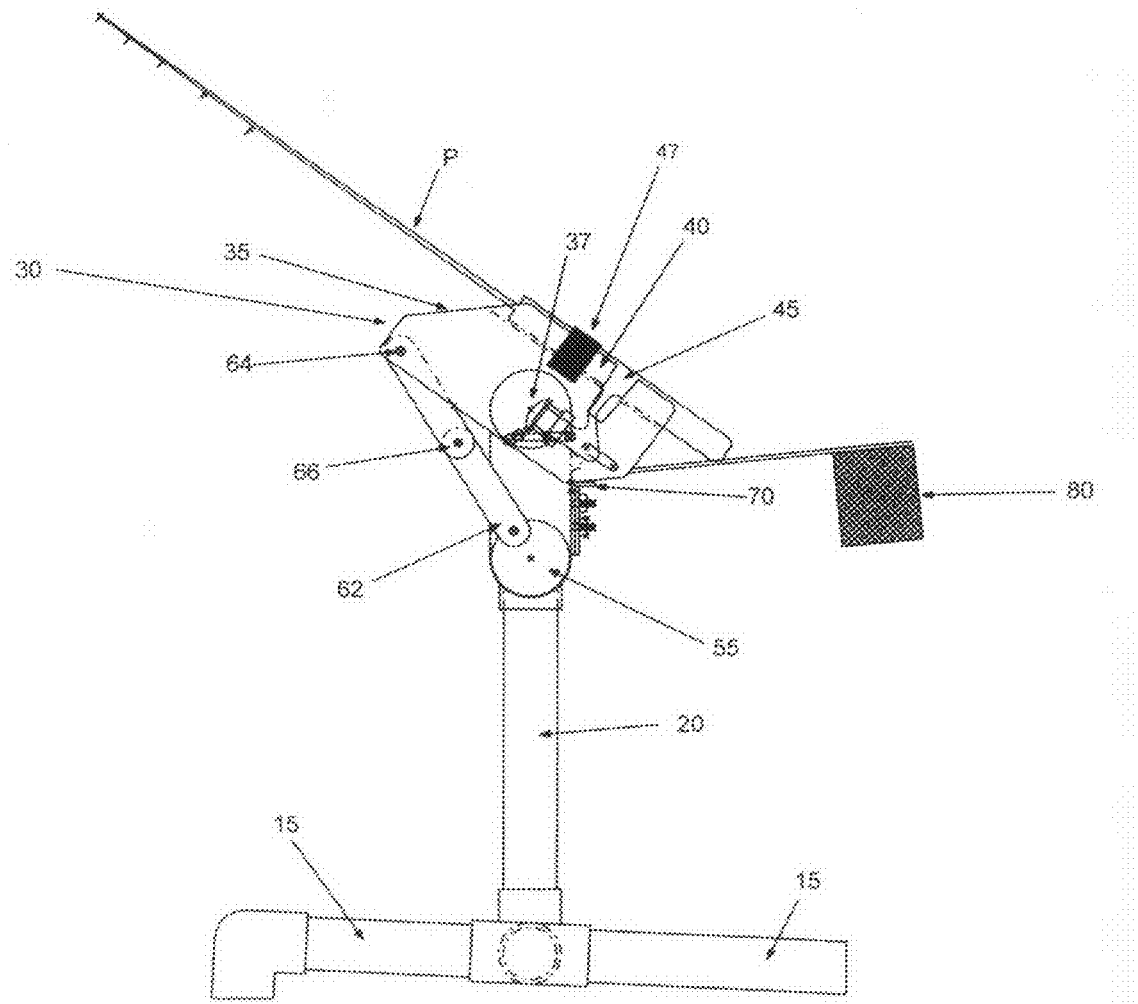
FIG. 1 is a perspective side view of the powered jigging device of the present invention.
Figure 2:
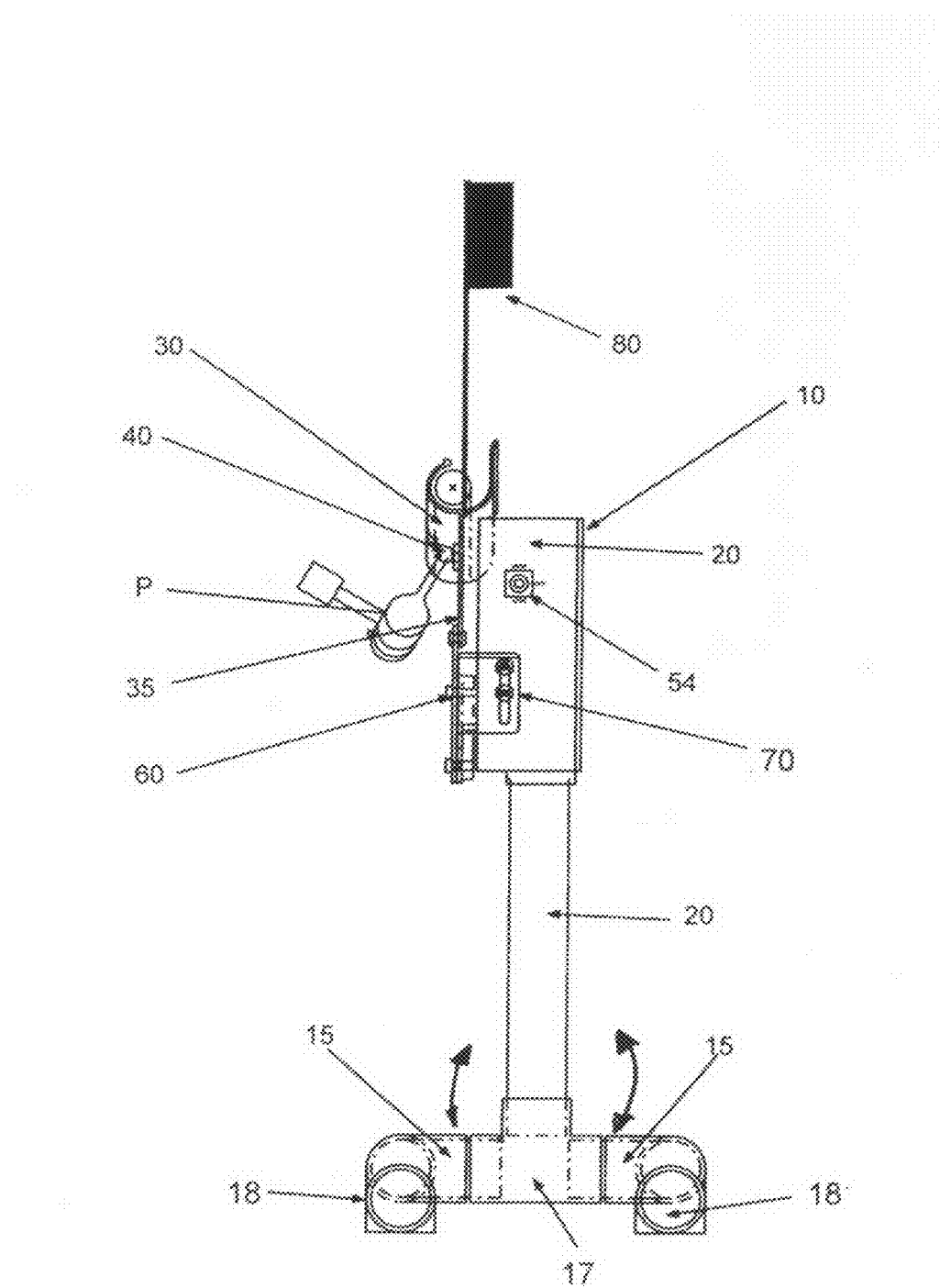
FIG. 2 is a perspective rear view of one embodiment of the powered jigging device of the present invention.
Figure 3:
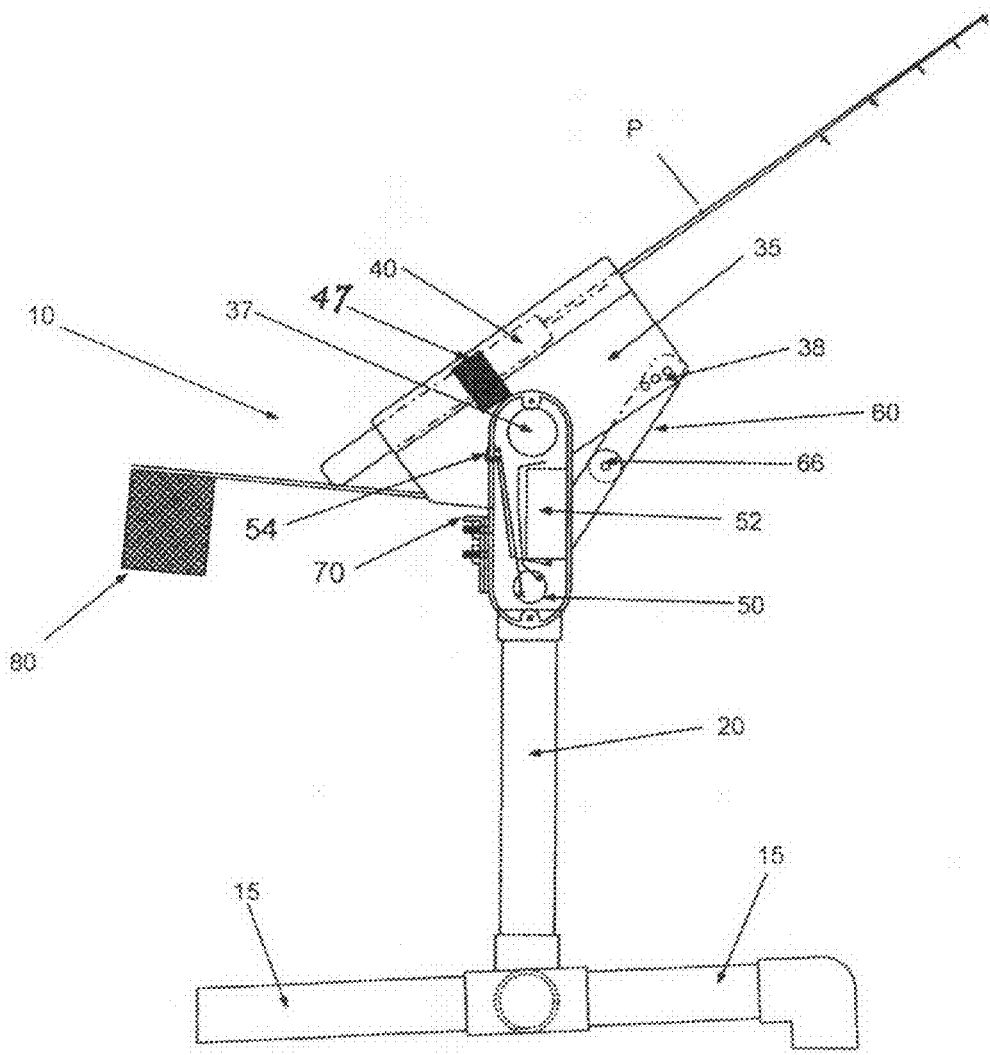
FIG. 3 is another perspective view of one embodiment of the powered jigging device of the present invention.

Turning now descriptively to the drawings, in which similar reference characters denote similar elements throughout the several views, FIGS. 1-3 provide various views of the powered jigging device 10 of the instant invention. The powered jigging device 10 includes a base section 15 secured to an upright support section 20 with a pole holder assembly 30 pivotally attached to the upright support section 20. The pole holder assembly 20 including a plate portion 35 positioned parallel to the upright support section 20 and pivotally attached at a pivot point 37 thereto, with a pole attachment portion 40 secured to the plate portion 35 above the pivot point 37 thereof. A fishing pole P is mounted in the pole attachment portion 40, which contains a slot 45 to accommodate the reel of the fishing pole P. In a further embodiment, a hook and loop retaining strap 47 secured to the pole attachment portion 40 is positioned to reversibly retain the fishing pole P in the pole attachment portion 40. A motor member 50 is rigidly secured to the upright support section 20 with a rotor member 55 operatively attached to the motor member 50 for rotation thereof. The motor member 50 is powered by at least one battery 52, with a switch member 54 operatively connected thereto for activating or deactivating the motor member 50. The details of the motor member 50 are best seen in FIG. 3. The upright support section 20 may include an enlarged portion that accommodates and encloses the motor member 50 and the battery 52 to protect these components from the elements. Preferably the motor member 50 is a low voltage gear motor operated at 1.5 to 6.0 volts with an output of about 10 to 30 revolutions per minute.

The rotor member 55 is positioned below the pivot point 37 of the plate portion 35. A multipivot point linkage 60 is pivotally secured at a first end 62 to the rotor member 55 and pivotally secured at an opposite second end 64 to one of a plurality of apertures 38 in the plate portion 35 of the pole holder assembly 30 below the pivot point 37 thereof. A stop member 70 is secured to the upright support section 20 to contact the pole holder assembly 30 and limit pivotal movement thereof. This feature allows adjustment throughout the entire stroke of the rotor member 55. The stop member 70 may include a rod member, a pin member or a similar stricture secured to the upright support section 20. A signal member 80 is attached to the pole holder assembly 30 to signal a fish bite. The signal member 80 can include a flag or similar easily observed device. Rotation of the rotor member 55 by the motor member 50 causes pivoting movement of the pole holder assembly 30 through the multipivot point linkage 60 there between to provide up and down jigging of the fishing pole P.

In a preferred embodiment of the invention, the base section 15 is pivotal from an orientation perpendicular to the upright support section 20 to an orientation parallel to the upright support section 20 as indicated in FIG. 2. The parallel orientation of the base section 15 provides for ease of transport or storage of the powered jigging device 10. In this preferred embodiment, the base section 15 of the powered jigging device 10 is H-shaped, with the upright support section 20 rigidly secured to and extending perpendicularly from the center of the connecting crossbar portion 17 between the two leg portions 18 of the H-shaped base section 15. The two leg portions 18 of the H-shaped base section 15 are pivotally secured to the crossbar portion 17 allowing the leg portions 18 to be positioned perpendicular to the upright support section 20 during use, or parallel to the upright support section 20 for transport or storage, as indicated above. It is preferred that the base section 15 and the upright support section 20 are fabricated from outdoor grade rigid PVC tubing and PVC joints, all of which are economically, commercially available. Other material for fabrication of the base section 15 and the upright support section 20 are contemplated without departing from the scope and spirit of the instant invention.

In another preferred embodiment of the invention, the motor member 50 is selectively operable at two speeds to provide slower or faster jigging of the fishing pole P. In addition, the amplitude of jigging of the fishing pole P secured in the pole holder assembly 30 can be affected by altering the point of attachment of the multipivot point linkage 60 to the holder assembly 30. The amplitude variation is achieved by the presence of multiple attachment apertures 38 in the plate portion 35 of the pole holder assembly 30. Changing the attachment point of the second end 64 of the multipoint pivot linkage 60 to the plate portion 35 provides this variation.

Figure 4:
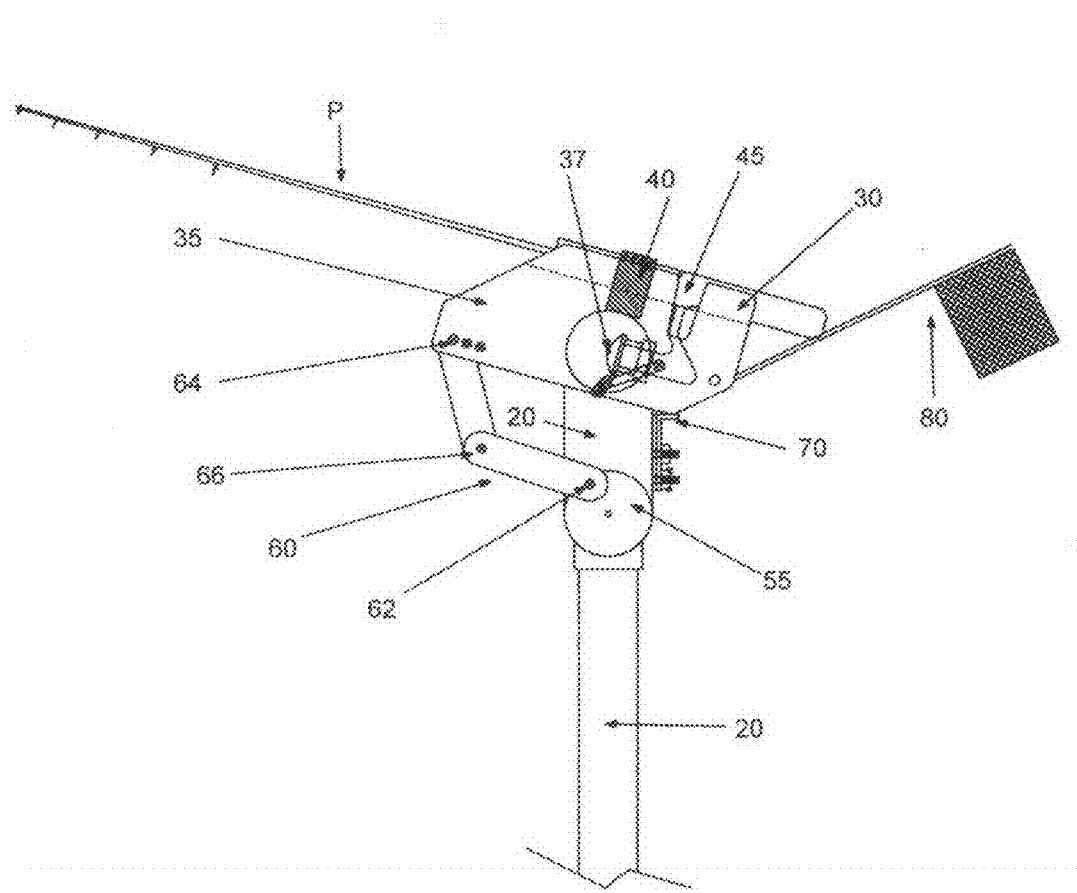
FIG. 4 is a perspective view of the jigging device of the present invention with the pole holder assembly at a stop position.
Figure 5:
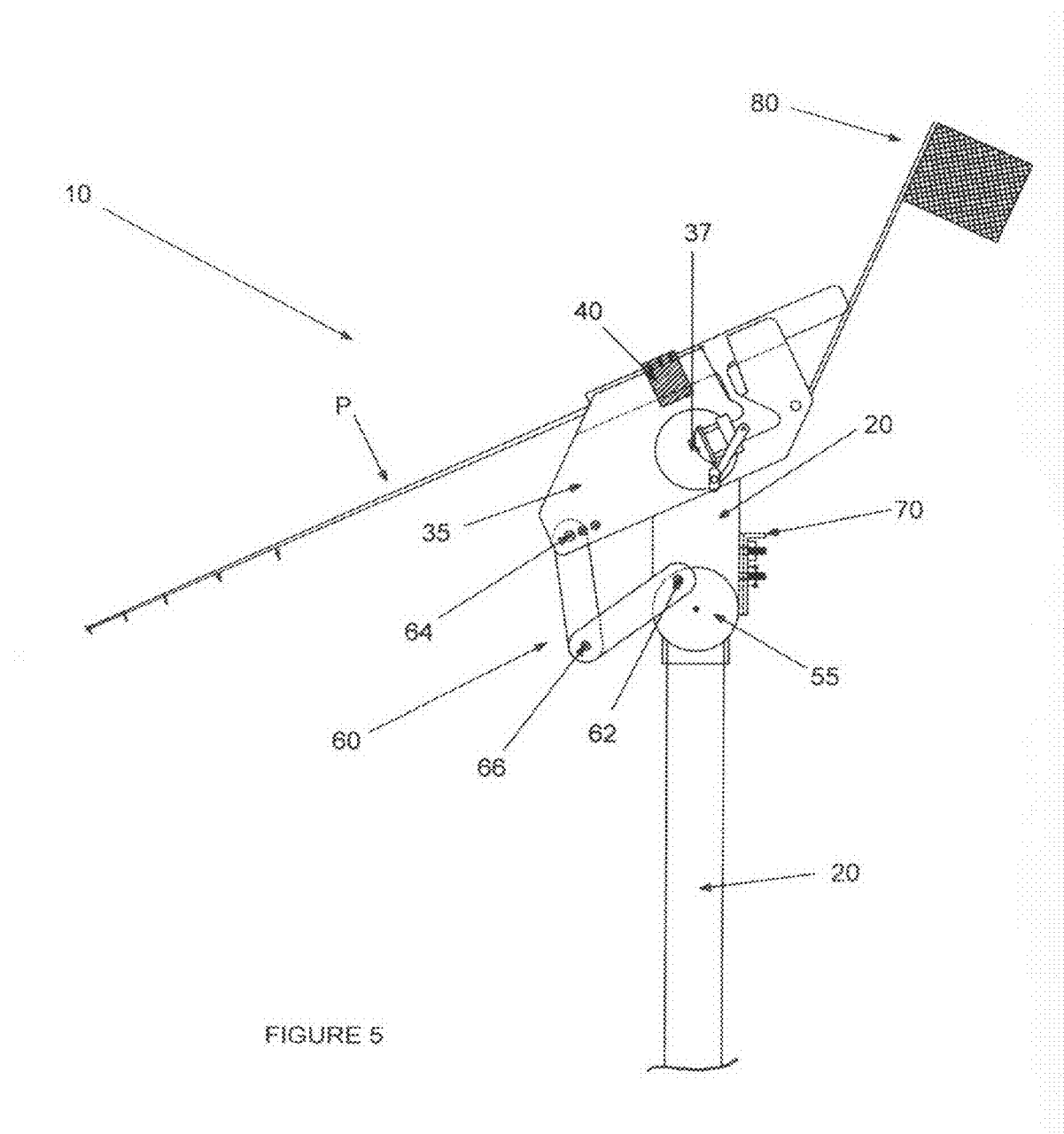
FIG. 5 is a perspective view of the jigging device of the present invention with the pole holder assembly signaling that a fish has taken the bait.

Referring again to the drawings, FIG. 1 illustrates a maximum upward movement of the pole holder assembly 30 and attached fishing pole P. FIG. 4 illustrates a lesser maximum upward movement of the pole holder assembly 30 provided by contact of the pole holder assembly 30 with the stop member 70 fastened to the upright support section 20. As illustrated in FIG. 5, a fish has taken the bait and pivoted the pole holder assembly 30 to the maximum downward movement of the attached fishing pole P. This condition causes the signal flag member 80 to elevate to maximum height and alert the fisherman that a fish has taken the bait.

In use, the fishing pole P is placed in the pole holder assembly 30 and strapped in with a hook and loop retaining strap 47. For ice fishing, the powered jigging device 10 is positioned with the end of the pole P above the center of the fishing hole in the ice. The fisherman activates the motor member 50 to get to the bottom of the jigging stroke, then turns the motor member 50 off. He then opens the bail of the reel and finds bottom with a depth finder weight. He set the bait to the desired distance from bottom, closes the reel bail, marks the line or pulls the line out of the hole by hand. He removes the depth finder weight and drops the bait and line back down the hole. Then he turns on the motor member 50 of the powered jigging device 10. At this point, he sets the amount of jigging and the speed of your jig bait. When a fish takes the bait, the fisherman simply grasps the retaining strap 47 with one hand and releases the pole P, while holding the pole P with the other hand. He pulls the pole P out of the pole holder assembly 30 and commences reeling in the fish. For pier or boat fishing, simply follow the same procedure with the powered jigging device 10 on the pier or boat.

It is important to note that when a fish bites and pulls the pole tip down, this is allowed by the multipivot point linkage 60 containing two pieces. The powered jigging device 10 does not fight the fish. The motor member 50 continues turning, but the linkage 60 does not pivot the pole holder assembly 30.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect. It will be understood by those skilled in the art that various changes in form and details may be made therein without departing from the spirit and scope of the invention.

I claim:

1. A powered jigging device for fishing comprising:
   a base section secured to an upright support section;
   a pole holder assembly pivotally attached to the upright support section, the pole holder assembly including a plate portion parallel to the upright support section and pivotally attached at a pivot point thereto, and a pole attachment portion secured to the plate portion above the pivot point thereof, the pole attachment portion adapted for supporting a fishing pole in alignment with the plate portion of the pole holder assembly, the pole attachment portion having a hollow area with a longitudinal axis located above the plate portion;
   a motor member rigidly secured to the upright support section with a rotor member operatively attached to the motor member for rotation thereof, the rotor member positioned below the pivot point of the plate portion; and
   a multipivot point linkage pivotally secured at one end thereof to the rotor member and pivotally secured at an opposite end thereof to the plate portion of the pole holder assembly at an attachment point adjacent the pivot point thereof, the multipivot point linkage and plate portion of the pole holder assembly positioned and moving in a common plate;
   whereby rotation of the rotor member by the motor member causes pivoting movement of the pole holder assembly through the multipivot point linkage there between.

2. The powered jigging device for fishing of claim 1, further including a stop member secured to the upright support section to contact the pole holder assembly and limit pivotal movement thereof, thereby allowing adjustment throughout an entire stroke of the rotor member.

3. The powered jigging device for fishing of claim 2, wherein the stop member includes a rod member or a pin member secured to the upright support section.

4. The powered jigging device for fishing of claim 1, further including a signal member attached to the pole holder assembly to signal a fish bite.

5. The powered jigging device for fishing of claim 1, wherein the base section is pivotal from an orientation perpendicular to the upright support section to an orientation parallel thereto.

6. The powered jigging device for fishing of claim 1, wherein the plate portion of the pole holder assembly includes a plurality of apertures for varying the attachment point of the multipivot point linkage thereto.

7. The powered jigging device for fishing of claim 1, wherein the motor member is powered by at least one battery.

8. A powered jigging device for fishing comprising:
   a base section secured to an upright support section;
   a pole holder assembly pivotally attached to the upright support section, the pole holder assembly including a plate portion parallel to the upright support section and pivotally attached at a pivot point thereto, and a pole attachment portion secured to the plate portion above the pivot point thereof, the pole attachment portion adapted for supporting a fishing pole in alignment with the plate portion of the pole holder assembly, the pole attachment portion having a hollow area with a longitudinal axis located above the plate portion;

a motor member rigidly secured to the upright support section with a rotor member operatively attached to the motor member for rotation thereof, the rotor member positioned below the pivot point of the plate portion;

a multipivot point linkage pivotally secured at one end thereof to the rotor member and pivotally secured at an opposite end thereof to the plate portion of the pole holder assembly at an attachment point adjacent the pivot point thereof, the multipivot point linkage and plate portion of the pole holder assembly positioned and moving in a common plane; and a stop member secured to the upright support section to contact the pole holder assembly and limit pivotal movement thereof, thereby allowing adjustment throughout an entire stroke of the rotor member;

whereby rotation of the rotor member by the motor member causes pivoting movement of the pole holder assembly through the multipivot point linkage there between.

9. The powered jigging device for fishing of claim 8, wherein the stop member includes a rod member or a pin member secured to the upright support section.

10. The powered jigging device for fishing of claim 8, further including a signal member attached to the pole holder assembly to signal a fish bite.

11. The powered jigging device for fishing of claim 8, wherein the base section is pivotal from an orientation perpendicular to the upright support section to an orientation parallel thereto.

12. The powered jigging device for fishing of claim 8, wherein the plate portion of the pole holder assembly includes a plurality of apertures for varying the attachment point of the multipivot point linkage thereto.

13. The powered jigging device for fishing of claim 8, wherein the motor member is powered by at least one battery.

14. A powered jigging device for fishing comprising:
a base section secured to an upright support section;
a pole holder assembly pivotally attached to the upright support section, the pole holder assembly including a plate portion parallel to the upright support section and pivotally attached at a pivot point thereto, and a pole attachment portion secured to the plate portion above the pivot point thereof, the pole attachment portion adapted for supporting a fishing pole in alignment with the plate portion of the pole holder assembly, the pole attachment portion having a hollow area with a longitudinal axis located above the plate portion;

a motor member rigidly secured to the upright support section with a rotor member operatively attached to the motor member for rotation thereof, the rotor member positioned below the pivot point of the plate portion;

a multipivot point linkage pivotally secured at one end thereof to the rotor member and pivotally secured at an opposite end thereof to one of a plurality of apertures in the plate portion of the pole holder assembly adjacent the pivot point thereof, the multipivot point linkage and plate portion of the pole holder assembly positioned and moving in a common plane;

a stop member secured to the upright support section to contact the pole holder assembly and limit pivotal movement thereof, thereby allowing adjustment throughout an entire stroke of the rotor member; and a signal member attached to the pole holder assembly to signal a fish bite;

whereby rotation of the rotor member by the motor member causes pivoting movement of the pole holder assembly through the multipivot point linkage there between.

15. The powered jigging device for fishing of claim 14, wherein the stop member includes a rod member or a pin member secured to the upright support section.

16. The powered jigging device for fishing of claim 14, wherein the base section is pivotal from an orientation perpendicular to the upright support section to an orientation parallel thereto.

17. The powered jigging device for ice fishing of claim 14, wherein the motor member is powered by at least one battery.

* * * * *